Dec. 22, 1970 SHIGERU HAYAKAWA ET AL 3,550,044

SOLID DELAY LINE

Filed March 24, 1969 3 Sheets-Sheet 1

INVENTORS
SHIGERU HAYAKAWA
MASANARI MIKODA
BY
Wenderoth, Lind & Ponack
ATTORNEYS INVENTORS
SHIGERU HAYAKAWA
MASANARI MIKODA
BY
Wenderoth, Lind & Ponack
ATTORNEYS

INVENTORS
SHIGERU HAYAKAWA
MASANARI MIKODA

BY

Wenderoth, Lind & Ponack
ATTORNEYS

United States Patent Office 3,550,044
Patented Dec. 22, 1970

3,550,044
SOLID DELAY LINE

Shigeru Hayakawa and Masanari Mikoda, Osaka, Japan, assignors to Matsushita Electric Industrial Co., Ltd., Osaka, Japan Filed Mar. 24, 1969, Ser. No. 809,895
Claims priority, application Japan, Apr. 9, 1968, 43/24,169
Int. Cl. H03h 9/30
U.S. Cl. 333—30 10 Claims

ABSTRACT OF THE DISCLOSURE

An ultrasonic delay line formed of a solid delay line medium with conventional input and output transducers. The unused surfaces have an outer region thereat which has a mechanical Q which varies from a low value at the unused surfaces to the high mechanical Q of the delay line medium at the interface of the outer region and the inner region of the body for attenuating spurious signals. The outer region can be formed by diffusing ions into the outer region by immersing the body in a bath of a fused salt containing the desired ions, or firing the body after coating it with an enamel or a paint containing the desired ions. It can also be formed by heating a body of delay medium having atoms of a material therein which act as nuclei of crystals so as to form a layer of crystallized material in which the crystals act as scattering centers for acoustic waves.

This invention relates to ultrasonic solid delay lines and more particularly to a delay medium having a means for reducing spurious signals in an ultrasonic solid delay line.

In an ultrasonic solid delay line the electrical signal (oscillation of electric potential) to be delayed is converted into a corresponding acoustic wave and launched into a suitable solid medium. The velocity of acoustic waves in solids lies in the range of 1–6 km./s., which is lower by a factor approximately $10^5$ than that of an electrical signal in a cable. Thus, a long delay can be obtained by using a comparatively short length path in the solid delay medium. After the acoustic wave has travelled a distance so that the vibration has undergone the required delay, it is converted back into an electrical signal.

To carry out this action, an ultrasonic solid delay line must consist basically of three components. The first is a transducer which converts the electrical signal into an acoustic wave. The second is the delay medium through which the acoustic wave travels and undergoes the required delay. The third is a second transducer which converts the acoustic wave back into the required signal. In an ultrasonic solid delay line, the transducers are piezoelectric transducers. A piezoelectric material undergoes a reversible strain on application of an electric field and gives rise to an electric field when it is strained. Crystalline quartz has this property and polarized ferroelectric ceramics such as barium titanate, lead zirconate titanate, and sodium-potassium niobate behave in a vary similar manner. A thin circular disc of crystalline quartz cut from a crystal in a suitable orientation is often used as transducer. The electrical input signal is applied to thin metal electrodes applied to opposite faces of the crystal disc. The field produced causes a vibrating deformation of the crystal, which launches an acoustic wave in the delay line medium which is in contact with one of the faces. The resultant wave travels through the medium along a path and arrives at the output end of the delay line where it produces a mechanical deformation of a quartz crystal which is used as the output transducer. This gives rise to an electric field in the crystal, and the signal is detected as a voltage signal at the electrodes of the output transducer.

The propagation of the acoustic wave in the medium will be explained with reference to a circular disc transducer having a diameter $d$ attached to the delay medium. The energy of the wave is emitted as a beam perpendicular to the transducer disc over a distance approximately $d^2/\lambda$ from the source, where $\lambda$ is the wavelength of the acoustic wave in the medium. The region where the wave propagates as a beam is defined as the near field. At a distance greater than $d^2/\lambda$ from the source, the energy is distributed in a diffraction pattern constituting a number of lobes when plotted in a polar diagram. This region is known as the far field. In many cases the path length of the wave is within the far field in order to obtain the required delay. Therefore, it is possible for signals to arrive at the output end of the delay line while traveling paths different from that characteristic of the main signal, since some of the transmitted energy spreads and is reflected from unused surfaces of the delay medium. These unwanted signals are known as secondary signals. It is known that the secondary signals can be reduced by coating the unused surfaces of the medium with acoustic absorbent, such as a resin or a solder, or by cutting the unused surfaces away. However, since it is very difficult to match mechanical impedances of the delay medium and the absorbent, some of the waves incident to the unused surfaces can be reflected into the medium and arrive at the output transducer. Therefore, a delay line which is to have a low secondary signal should have the dimension of the delay medium enlarged. In an ultrasonic solid delay line there are other unwanted signals called multiple travel signals. The multiple travel signals arise from echoes which travel back and forth along the path of the main signal because the transducers partially reflect the incident acoustic wave. The delays of the multiple travel signals are close to odd multiples of the delay of the main signal. Among them, the third multiple travel signal is normally the largest signal. They can be suppressed by providing the transducers with backing means to reduce the reflections at the free ends of the transducers.

A delay medium requires a high mechanical Q and a low temperature coefficient of delay time. Fused quartz having approximately $10^5$ mechanical Q in a megacycle frequency range has enjoyed widespread use as a delay medium. However, the temperature coefficient of delay time is relatively large, being about 80 p.p.m./° C., and a bulky thermostat is often necessary to counteract the effect of significant temperature changes. Recently, mixed oxide glasses consisting essentially of $K_2O$, PbO and $SiO_2$ have been developed as a delay medium. These glasses have a low temperature coefficient of delay time, a coefficient which is less than $\pm 10$ p.p.m./° C., and they can be used for relatively short delays, although the mechanical Q is as small as 3000–4000 in the megacycle frequency range.

Delay line transducer materials fall into frequency categories. At a low frequency less than 10 mc., the piezoelectric ceramics are most widely used. At higher frequencies, the high dielectric constants make electrical impedance matching extremely difficult. Crystalline quartz is still widely used because of its superior mechanical properties. For the range above 100 mc., deposited thin films of binary II–VI compounds are used. For delay line applications the interesting properties of the piezoelectric ceramics are dielectric constant, electromechanical coupling coefficient and sound velocity. The coupling coefficient $k$ correlates with the bandwidth of the transducer. A clamped capacitance determining the electrical impedance of the transducer is proportional to $\epsilon^S/v$, where $\epsilon^S$ is the clamped dielectric constant of the ceramic and $v$ is the sound velocity in the ceramic. Therefore, $kv/\epsilon^S$ is known to be a good figure for determining the desirability of application to a delay line.

The bond between the transducers and the delay medium is important for achievement of the best performance of the delay line. The higher the frequency of operation, the more critical the bond. For a high frequency line, the bond is made by cold welding indium films evaporated on the medium and the transducer. For low frequency lines, sometimes a soldering technique can be used. The two faces to be joined are metal coated, either by evaporation or electroless plating, and are adhered by soldering. The thickness of the bond has a critical effect on the frequency response because of the difference in mechanical impedance between the bond and the medium or the transducer. It is best to use either a very thin bond, $\lambda/100$ or less, or else a $\lambda/4$ bond, where $\lambda$ is the acoustic wavelength in the bond material at the midband frequency. These bonds give a smooth and wideband response. Because of the difficulty in controlling the thickness of the bond, conventional soldering techniques have not been the preferred method for bonding transducers to a delay medium.

Backings attached to the transducers smooth out the response and reduce the effects of bond thickness. The mechanical impedance of the backing material must be close to that of the transducer. A thick layer of low melting point solder applied to an evaporated or plated metal film on the transducer serves this purpose well.

It is a primary purpose of the present invention to provide improved solid delay lines. A further purpose of the present invention is to provide a solid delay line having improved ability to cancel or reject spurious signals. A further purpose is to provide a solid delay line having improved main signal to noise level ratio. A specific purpose is to provide a delay medium having a mechanical Q which varies with the distance from unused surfaces of the delay medium to reduce the spurious signals in the delay line.

In a solid delay line according to the present invention, the main signal propagates through a high Q region of the delay medium with minor interference, and the spurious signals are made incident to a low Q region of the delay medium, which absorbs the energy of the spurious signal, and cancels or attenuates the spurious signals.

Additional purposes, features and advantages of the present invention will become apparent to those skilled in the art from the following detailed description and attached drawings in which, by way of example, only the preferred embodiments of the present invention are illustrated:

Figure 1:
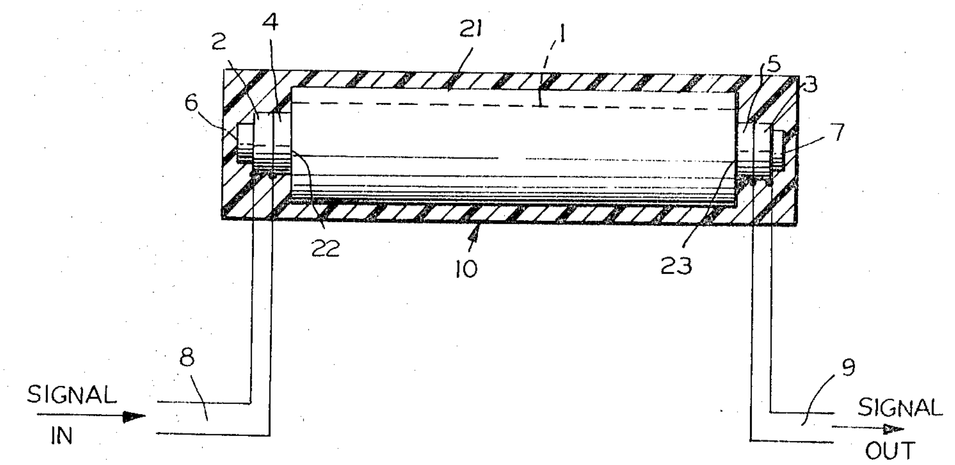
FIG. 1 is a schematic elevational view, partly in section, of an acoustic solid delay line assembly.

A simple delay line assembly, as schematically illustrated in FIG. 1, includes a delay medium 1, transducer members 2 and 3, bonding members 4 and 5, backing members 6 and 7, electrical signal input and output circuits 8 and 9, and a coating 10. Said delay medium 1 has at least one unused surface 21 and used surfaces such as input face 22 and output face 23 in contact with said transducer members 2 and 3 through said bonding members 4 and 5, respectively. Delay medium 1 can be of any conventional form such as an elongated cylinder, a disc, a polygonal plate with reflection surfaces or other known delay line medium geometry. It is molded from known delay line medium such as fused quartz, akali-lead-silicon oxide glass, or alkali-lead-silicon fluo-oxide glass.

Transducers 2 and 3 are composed of a crystalline piezoelectric material such as barium titanate or quartz, or a polycrystalline piezoelectric material such as lead titanate zirconate or lead magnesium niobate titanate zirconate. The most preferred piezoelectric ceramic is lead magnesium niobate titanate zirconate in the rhombohedral phase, because the figure of merit $kv/\epsilon^S$, is larger than that of other ceramics. Said transducers 2 and 3 are adhered to, or otherwise maintained in tight contact with, input face 22 and output face 23 on the delay medium 1 through the bonding members 4 and 5. According to the present invention, both the faces of the transducers and of the medium are metallized by a conventional evaporation method and sealed together with a solder in form of thin film for forming the bonding members 4 and 5. The resultant thickness of the bond 4 and 5 can easily be kept as small as $5\mu$ by controlling the thickness of said solder film. The solder may be composed of lead, tin, indium, bismuth, and cadmium. Compositions and properties of suitable solder for the bond are illustrated in Table 1. The acoustic wave velocity in these solders is about 1,000 m./s. for the shear mode. Therefore, a bond thickness of $\lambda/100$ can easily be achieved for a shear wave of a few megacycles by said soldering technique. It is preferable for backing members 6 and 7 to have a mechanical impedance close to that of the transducers, and they can be made of a low melting-point solder such as Newton metal or a silver paint. The Newton metal is comprised of 52% Bi, 32% Pb, and 16% Sn by weight. Backing is effective in smoothing the response but impairs attenuation in the delay line. Therefore, it is not always used in a delay line. Circuits 8 and 9, shown diagrammatically, can include any of the various components that are conventionally associated with delay lines. Coating 10 is preferably a soft resin.

Figure 2:
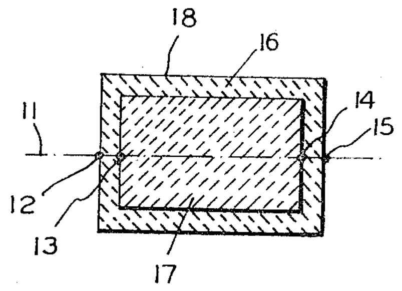
FIG. 2 is a cross section of the delay medium of the acoustic solid delay line shown in FIG. 1.
Figure 3:
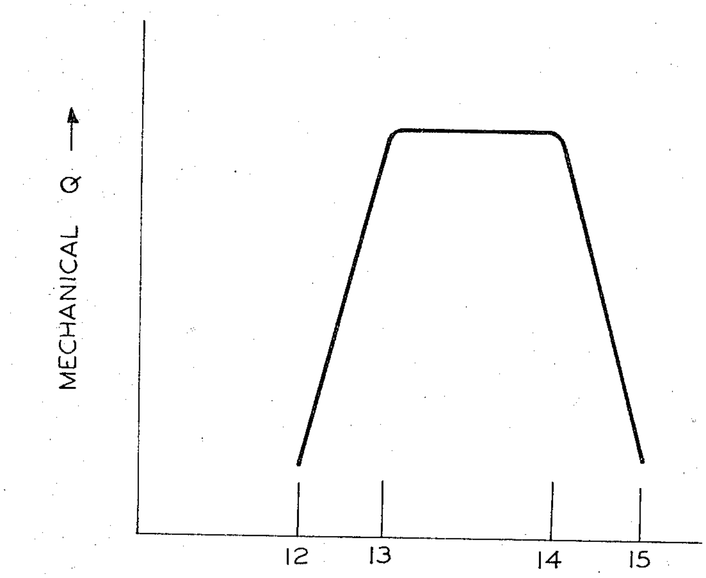
FIG. 3 is a graph illustrating the distribution of mechanical Q in said medium along the line shown in FIG. 2.

Referring to FIG. 3 graphically illustrating mechanical Q at a position on line 11 in FIG. 2, the reference numbers on the lateral axis in FIG. 3 correspond to the positions having the same numbers in FIG. 2. An inner region 17 of said delay medium has a high mechanical Q. An outer region 16 has a mechanical Q which ranges from a low value at the unused surface 18 to said high value at the interface with said inner region 17. The main wave induced in said medium 1 propagates mainly in the inner region 17. The energy resulting from the beam spread and the side lobes of the diffraction pattern strikes into the region 16, and is dissipated, through processes such as viscous damping and thermal effects and stress-induced migration so that it does not return to the inner region 17.

In the prior art, such spurious signals have been reduced by an absorbent coating applied to said unused surface 18. However, since it is impossible to match the mechanical impedance of the delay medium with that of the absorbent, some of the incident energy can reflect at the surface 18 and result in spurious signals at the output.

The novel delay line medium according to the present invention, can be made by a surface treatment which diffuses appropriate ions into the medium from the unused surface 18. Said surface treatment can be carried out by immersing a body of the medium in a desired form in a fused salt bath containing appropriate ions, or by heating a body of the medium coated with an enamel or paste containing appropriate ions to be diffused. It is necessary that said appropriate ions decrease the mechanical Q of said medium. The thickness of the outer region 16, the distance from 12 to 13 in FIG. 3, is controlled by the temperature and the time of the immersion of the heat-treatment so as to result in the decrease of the spurious signal not accompanied with the decrease of the main signal. The value and the distribution of the mechanical Q in the region 16 are dependent on the amount and distribution of diffused ions slightly from inner region to the unused surface 18 of the medium. In this case, since the composition changes gradually the acoustic wave incident into the outer region 16 dissipates the energy without being reflected back into the inner region 17.

Any fused salt can be used as long as the medium after immersion has a distribution of mechanical Q in accordance with the curve of FIG. 3. Silver, lithium, or sodium ion will diffuse to an appreciable extent into a glass at a temperature ranging from the transition temperature to the softening temperature, and are effective to decrease the mechanical Q. Especially preferred as a fused salt is a fused silver salt, a fused lithium salt or a fused sodium salt, such as silver halide, lithium carbonate, and sodium nitrate. Ion diffusion into a glass body can be carried out preferably at a temperature range between the transition temperature and the softening temperature of the glass body. Below the transition temperature, the diffusion is not appreciable and above the softening temperature, the glass body deforms due to viscous flow. After the immersion step, the diffusion layers at the desired surfaces, such as the surfaces where the transducers are to be attached, are removed by any suitable method such as cutting or polishing.

Figure 4:
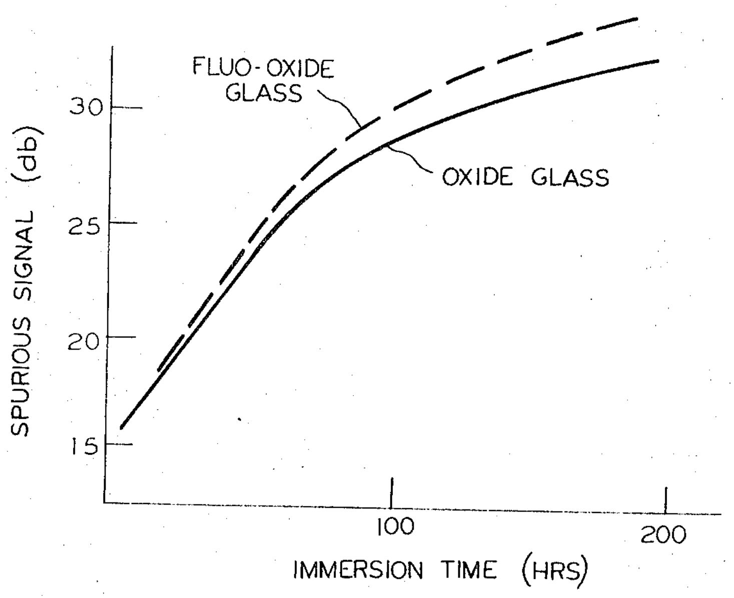
FIG. 4 is a graph illustrating variation of spurious signals for periods of time at which delay media are immersed in fused silver chloride.

FIG. 4 shows the variation in the spurious signals in a delay line for various immersion times when the delay lines are produced from a glass media immersed in fused silver chloride at 550° C. The composition of the glass was 73 mole percent $SiO_2$, 19.1 mole percent PbO, 7.9 mole percent $K_2O$ for the oxide glass, and 72 mole percent $SiO_2$, 15.5 mole percent PbO, 3.2 mole percent $PbF_2$, 7 mole percent $K_2O$, 1.5 mole percent $Al_2O_3$, 0.8 mole percent $As_2O_3$ for the fluo-oxide glass. These compositions are suitable for use as a delay line medium because of the small temperature coefficient of delay time, i.e. less than several p.p.m./° C. It is clear from FIG. 4 that the fluo-oxide glass subjected to the immersion process is superior in its ability to reduce the spurious signals to the oxide glass subjected to the immersion process. Preferred glass compositions for use as a delay medium are set forth in Table 2. The addition of 0.5 mole percent to 3.0 mole percent of $Al_2O_3$ to fluo-oxide glass stabilizes the acoustic properties of the glass. The addition of 0.1 mole percent to 2.0 mole percent of $As_2O_3$ to fluo-oxide glass decreases the attenuation of the acoustic wave. Moreover, $As_2O_3$ acts as a fining agent in the glass. Substitution in the glass system of more than 10 atomic percent fluorine ion for oxygen ion causes the glass body to crystallize throughout the whole region and greatly impairs the propagation of the main signal.

Diffusion of desirable ions into glass can be achieved by coating the unused surface, such as the surface which is not used to attach transducers, of the glass delay medium with a silver paste or a glass enamel containing the desired ion and by firing the coated delay medium at a temperature between the transition and the softening temperature of the glass medium for a time necessary for producing the desired thickness of the diffusion layer at the unused surface.

Figure 5:
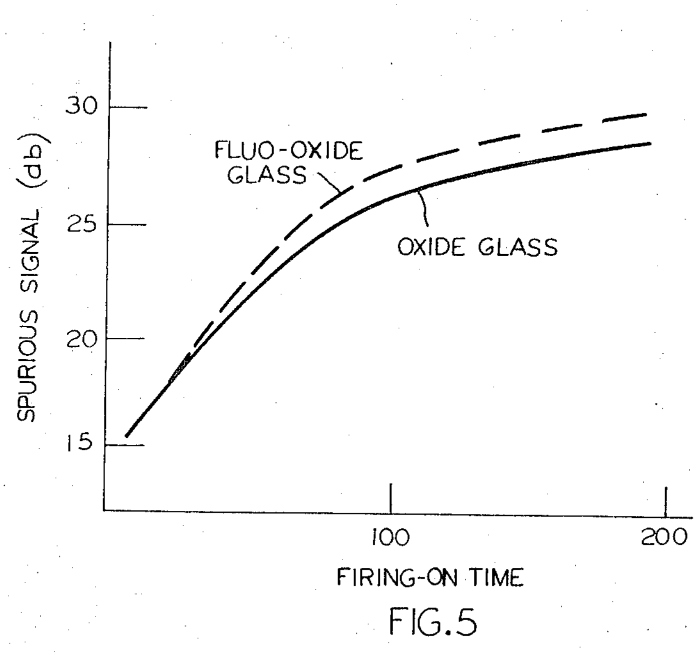
FIG. 5 is a graph illustrating variation of spurious signals for periods of time during which a silver paste is fired on a glass media.

A preferred silver paste is produced by the following procedure. 95 g. silver powder, 5 g. polymeta-acrylate, and 20 g. terpineol are mixed for time ranging from 20 to 150 hrs. in a conventional ball-mill. The particle size of the silver powder is preferably less than 2μ. FIG. 5 shows the variation in the spurious signals in delay lines where the delay medium has been fired at 500° C. for various firing times with said silver paste painted on the unused surfaces of the delay medium. The compositions of delay media are the same as those in FIG. 4.

Figure 6:
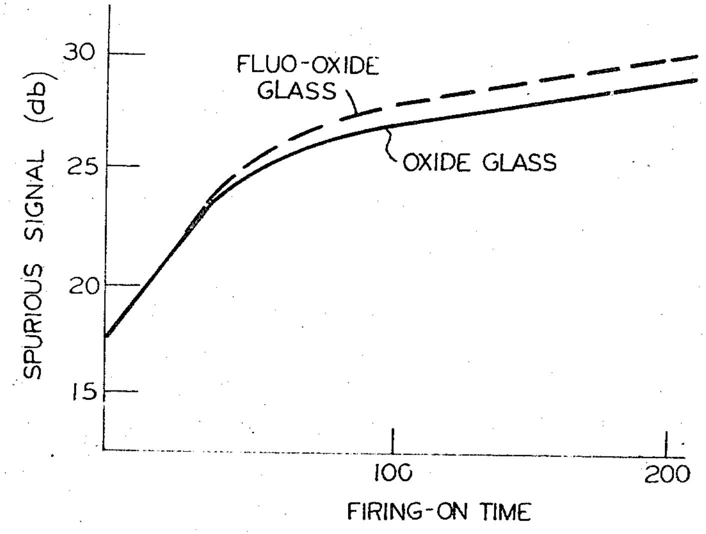
FIG. 6 is a graph illustrating variation of spurious signals for periods of time during which a glass enamel is fired on a glass media.

A preferred glass enamel composition is a mixture consisting essentially of 100 g. of glass frit, 3 g. of cellulose-acetate-butylate, 17 g. of terpineol, and 1 g. of surface-active-agent. The mixture is milled in a conventional ball-mill and forms an enamel. One preferred composition of the glass frit is 28.5% by weight $Na_2O$, 20% by weight PbO, 6.0% by weight $SiO_2$, and 45.5% by weight $B_2O_3$. The glass frit is produced as follows: The composition is melted in a platinum crucible for 30 minutes at a temperature from 800° C. to 1200° C. and is quenched to room temperature and then is ground to particles of about 1μ in size. FIG. 6 shows the variation in the spurious signals in the delay lines where the glass enamel has been painted onto the unused surfaces of the delay media and fired at 550° C. for various times.

Other compositions of glass frit used in the present invention are set forth in Table 3 together with the mechanical properties thereof. The compositions contain some lithium, sodium, and/or silver ions that migrate into the glass medium and form the outer region 16 in the glass medium during the firing process. The preferred glass frit compositions have a value of mechancal impedance similar to that of the glass medium because good mechanical matching between the glass medium and glass frit permits transmission of incident waves at the unused surface into the glass frit without reflection, and permits effective dissipation of the acoustic energy of the wave in the glass frit.

During the immersion or the firing processes, the desired ions such as silver, lithium, or sodium ions can migrate into the medium so as to form the aforesaid outer region having a mechanical Q distributed in a manner shown by the curve of FIG. 3. Preferred immersion or firing times have been found to be more than 10 hrs., as shown in FIGS. 4, 5 and 6. However, extremely long immersion or firing times result in diffusion of the ions in question into the inner region of the delay medium and attenuation of the main signal. Further, the cooling cycle for the heating processes such as immersion and firing are important because the cooling rate is known to effect the acoustic properties of the glass medium. In the aforesaid processes, cooling rate is always 5° C./hr., which is a preferred cooling rate. In a delay line comprising the novel delay medium, unwanted waves propagating into the outer region 16 have the energy thereof dissipated and they only slightly affect the output transducer 3 so that the spurious signal in the delay line is greatly reduced.

The spurious signals can also be suppressed by using a glass medium which has a crystallization layer at the outer region adjacent to the unused surface. Said localized crystallization layer can be formed by a heat-treatment of the glass body containing ions which act as a nucleus for crystallization. The thickness of the localized crystallization layer can be controlled by the heating temperature and the heating time. Preferred ions for this purpose are titanium, zirconium, and platinum ions. A crystal precipitated in the glass medium acts as a scattering center for scattering the acoustic wave. A further feature of the partially crystallized glass for use as a delay medium is that the crystallization process of glass proceeds from the surface to the inner region and forms crystals having a needle-like structure. Such crystals having a needle-like structure scatter and suppress the unwanted waves in a way similar to that of a cutting technique in which a delay line medium is partly cut so as to form a zig-zag unused surface.

Figure 7:
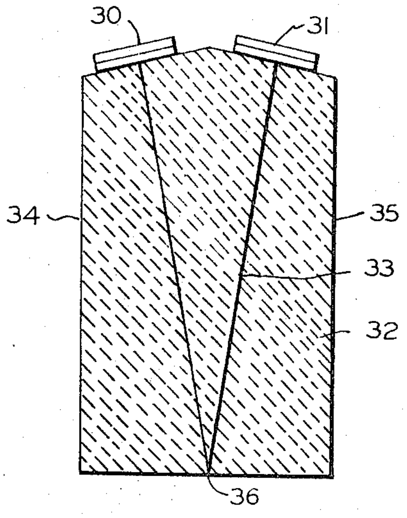
FIG. 7 is a cross sectional view of an ultrasonic solid delay line for a "PAL" color system, which is constructed according to the present invention.

FIG. 7 illustrates a delay line for a "Pal" color system produced according to the present invention. Transducers 30 and 31 are lead magnesium-niobate zirconate titanate ceramic, which is polarized parallel to the two electroded surfaces, one of which is free and the other of which is bonded to delay medium 32. The delay medium is a reflection type having a reflection surface of the acoustic wave. Shear wave activated with input transducer travels in delay medium 32 along a path 33 by the reflection at the surface 36, shown typically in the figure. The composition of said delay medium is similar to that of sample No. 4 in Table 2, and the unused surfaces, the upper and lower surfaces perpendicular to the drawing and both the sides 34 and 35, are painted with silver paint and fired at 550° C. for 50 hrs. The bond between the transducers and the delay medium is achieved by soldering according to the present invention. Table 4 shows characteristic properties of said delay line.

Although the present invention has been described with respect to specific details of certain embodiments thereof, is not intended that such details be limitations upon the scope of the invention except insofar as set forth in the following claims.

TABLE 1

| Composition (wt. percent) | | | | Liquidus temperature (° C.) | Solidus temperature (° C.) |
|---|---|---|---|---|---|
| Bi | Pb | Sn | In | | |
| 57 | 2 | 41 | ------ | 133 | 128 |
| 57 | 1 | 42 | ------ | 135 | 135 |
| 55 | 5 | 40 | ------ | 136 | 121 |
| ------ | ------ | 50 | 50 | 127 | 116 |
| ------ | ------ | 58 | 42 | 145 | 117 |
| ------ | ------ | 42 | 58 | 123 | 117 |

TABLE 2

| | Oxide glass (mole percent) | | | Fluo-oxide glass (mole percent) | | |
|---|---|---|---|---|---|---|
| | 1 | 2 | 3 | 4 | 5 | 6 |
| $SiO_2$ | 73.0 | 70.6 | 73.6 | 69.0 | 72.0 | 71.9 |
| PbO | 19.1 | 20.2 | 16.8 | 17.5 | 15.5 | 16.0 |
| $PbF_2$ | ------ | ------ | ------ | 4.0 | 3.2 | 3.0 |
| $K_2O$ | 7.9 | 8.5 | 9.6 | 8.0 | 7.0 | 6.6 |
| $Na_2O$ | ------ | 0.7 | ------ | ------ | ------ | ------ |
| BaO | ------ | ------ | ------ | ------ | ------ | ------ |
| $Bi_2O_3$ | ------ | ------ | ------ | ------ | ------ | ------ |
| $Al_2O_3$ | ------ | ------ | ------ | 1.0 | 1.5 | 1.5 |
| $As_2O_3$ | ------ | ------ | ------ | 0.5 | 0.8 | 1.0 |
| Temperature coefficient of delay time ($10^{-6}$/° C.) | 0.06 | 0.38 | 0.08 | 1.3 | 1.2 | 0.8 |
| Mechanical quality, factor Q | 4,500 | 3,000 | 4,800 | 3,900 | 4,300 | 4,700 |
| Mechanical impedance ($10^6$ kg./m.², sec.) | 8.9 | 9.2 | 8.7 | 9.2 | 8.9 | 8.7 |

TABLE 3

| Chemical composition (wt. percent) | Density ($10^3$ kg./m.³) | Mechanical impedance (kg./m.², sec.) |
|---|---|---|
| $Ag_2O$, 27.0~31.0<br>$Li_2O$, 61.0~65.0<br>$B_2O_3$, 6.0~8.2 | 3.56~3.70 | 9.4~10.6×$10^6$ |
| $Ag_2O$, 26.0~28.0<br>$B_2O_3$, 48.0~52.0<br>$SiO_2$, 6.0~8.0<br>$Na_2O$, 14.0~16.0 | 3.40~3.62 | 9.6~10.5×$10^6$ |
| $Li_2O$ 12.0~15.0<br>PbO, 21.0~24.0<br>$P_2O_5$, 62.0~65.0 | 3.48~3.65 | 9.1~10.1×$10^6$ |
| $Na_2O$, 23.0~26.0<br>$P_2O_5$, 55.0~57.0<br>PbO, 18.0~21.0 | 3.60~3.74 | 8.0~9.3×$10^6$ |
| $Li_2O$, 13.0~16.0<br>$B_2O_3$, 64.0~66.0<br>PbO, 18.0~21.0 | 3.51~3.65 | 8.7~9.8×$10^6$ |
| $Na_2O$, 27.0~32.0<br>$B_2O_3$, 44.0~52.0<br>PbO, 16.0~19.0 | 3.40~3.60 | 7.0~8.3×$10^6$ |
| $Na_2O$, 26.0~29.0<br>$B_2O_3$, 45.5~48.0<br>$SiO_2$, 3.0~7.0<br>PbO, 17.0~20.5 | 3.50~3.73 | 7.0~7.8×$10^6$ |
| $Li_2O$, 12.0~14.0<br>$B_2O_3$, 51.0~53.0<br>$SiO_2$, 3.5~5.0<br>PbO, 18.0~20.0 | 3.50~3.61 | 7.7~7.9×$10^6$ |

TABLE 4

| Delay time, μsec. | Attenuation, db | Spurious signal, db | Band width, mc. | Center frequency, mc. | Drift of delay time, ηsec. | Temperature coefficient of delay time, p.p.m./° C. at 25° C. | Weight, g. |
|---|---|---|---|---|---|---|---|
| 64.0 | 10 | −25 | 2.5 | 4.43 | ±1.3 | 0+0.9 | 55 |

What is claimed is:

1. An ultrasonic delay line comprising a solid delay line medium having used surfaces such as input and output faces and reflection surfaces and unused surfaces and signal input and output transducers attached to said input and output faces, respectively, for forming and picking up an acoustic wave in said delay line medium, said delay line medium having an inner region having a high mechanical Q and having an outer region at said unused surfaces, the mechanical Q of said outer region ranging from a low value at said unused surfaces to the high value of the mechanical Q at the interface between said inner and outer regions, whereby a main wave of said acoustic wave propagates through said inner region and unwanted waves of said acoustic wave are suppressed by said outer region.

2. An ultrasonic delay line as claimed in claim 1 wherein said delay line medium is formed of a material selected from the group consisting of alkali-lead-silicon-oxide glass and alkali-lead-silicon-fluo-oxide glass.

3. An ultrasonic delay line as claimed in claim 2 wherein said delay line mechanism is fluo-oxide glass and has fluorine atoms substituted for oxygen atoms in an amount less than 10 atomic percent.

4. An ultrasonic delay line as claimed in claim 1 wherein said signal input and output transducers are attached to said input and output faces, respectively, by means of a thin layer of a solder comprising 1–5% lead, 40–42% tin, and 55–57% bismuth, or 40–60% tin and 40–60% indium, all proportions being percent by weight.

5. An ultrasonic delay line as claimed in claim 1, wherein said delay line medium is of glass selected from the group consisting of potassium-lead-silicon oxide glass and potassium-lead-silicon fluo-oxide glass, and said outer region comprises a crystallized layer of said glass.

6. An ultrasonic delay line as claimed in claim 1, wherein said input and output transducers have a backing member which is a silver paint or a Newton metal.

7. A method of making a glass delay line medium having an inner region with a high value of mechanical Q and an outer region of the unused surfaces of said medium with a mechanical Q ranging from a low value at the surface to said high value at the interface with said inner region, comprising providing a glass delay line medium body in a desired form, immersing said glass body in a fused salt selected from the group consisting of silver halide, lithium carbonate and sodium nitrate so as to form said outer region by diffusion of the atoms of said fused salt into said glass body and removing the diffusion layers at desired surfaces.

8. A method of making a glass delay line medium having an inner region with a high value of mechanical Q and an outer region on the unused surfaces of said medium with a mechanical Q ranging from a low value at the surface to said high value at the interface with said inner region, comprising providing a glass delay line medium body in a desired form, applying an enamel to the unused surfaces of said glass delay line medium body, and heating said body with the enamel coated thereon at a temperature between the transition and softening temperatures of said glass delay line medium so as to form said outer region by diffusion of active atoms included in said enamel into said glass delay line medium body, said enamel comprising a glass frit containing ions taken from the group consisting of lithium, sodium, and silver ions and mixtures thereof.

9. A method of making a glass delay line medium having an inner region with a high value of mechanical Q and an outer region on the unused surfaces of said medium with a mechanical Q ranging from a low value at the surface to said high value at the interface with said inner region, comprising providing a glass delay line medium body in a desired form, applying a silver paint to said unused surfaces of said glass delay line medium body, and heating said glass delay line medium body having said silver paint coated thereon at a temperature between the transition and softening temperatures of said glass delay line medium so as to form said outer region by a diffusion of silver atoms included in said silver paint into said glass delay line medium body, said silver paint comprising, as the active element, silver powder having a particle size less than 2$\mu$.

10. A method of making a glass delay line medium having an inner region with a high value of mechanical Q and an outer region on the unused surfaces of said medium with a mechanical Q ranging from a low value at the surface to said high value at the interface with said inner region; comprising providing a glass delay line medium body in a desired form and having therein atoms of a metal taken from the group consisting of titanium, zirconium and platinum, heat treating the glass delay line medium body at the said unused surfaces for a time and at a temperature for forming a crystallization layer having precipitated crystals therein acting as scattering centers for acoustic waves.

References Cited

UNITED STATES PATENTS

| | | | |
|---|---|---|---|
| 3,254,317 | 5/1966 | Bauer | 333—30 |
| 3,259,858 | 7/1966 | Meitzler | 333—30 |
| 3,383,631 | 5/1968 | Korpel | 333—30 |

HERMAN KARL SAALBACH, Primary Examiner

T. VEZEAU, Assistant Examiner